Patented June 19, 1928.

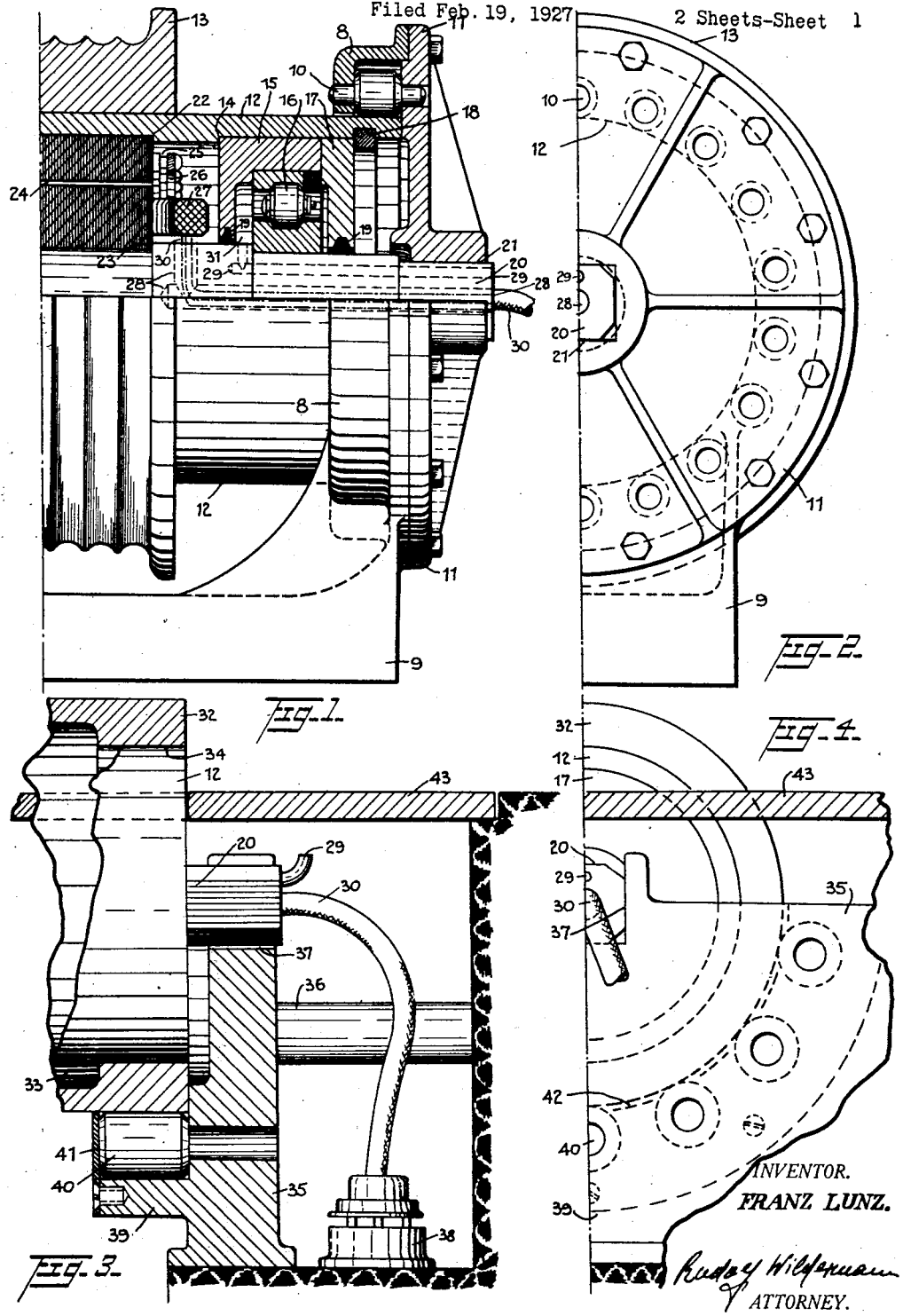

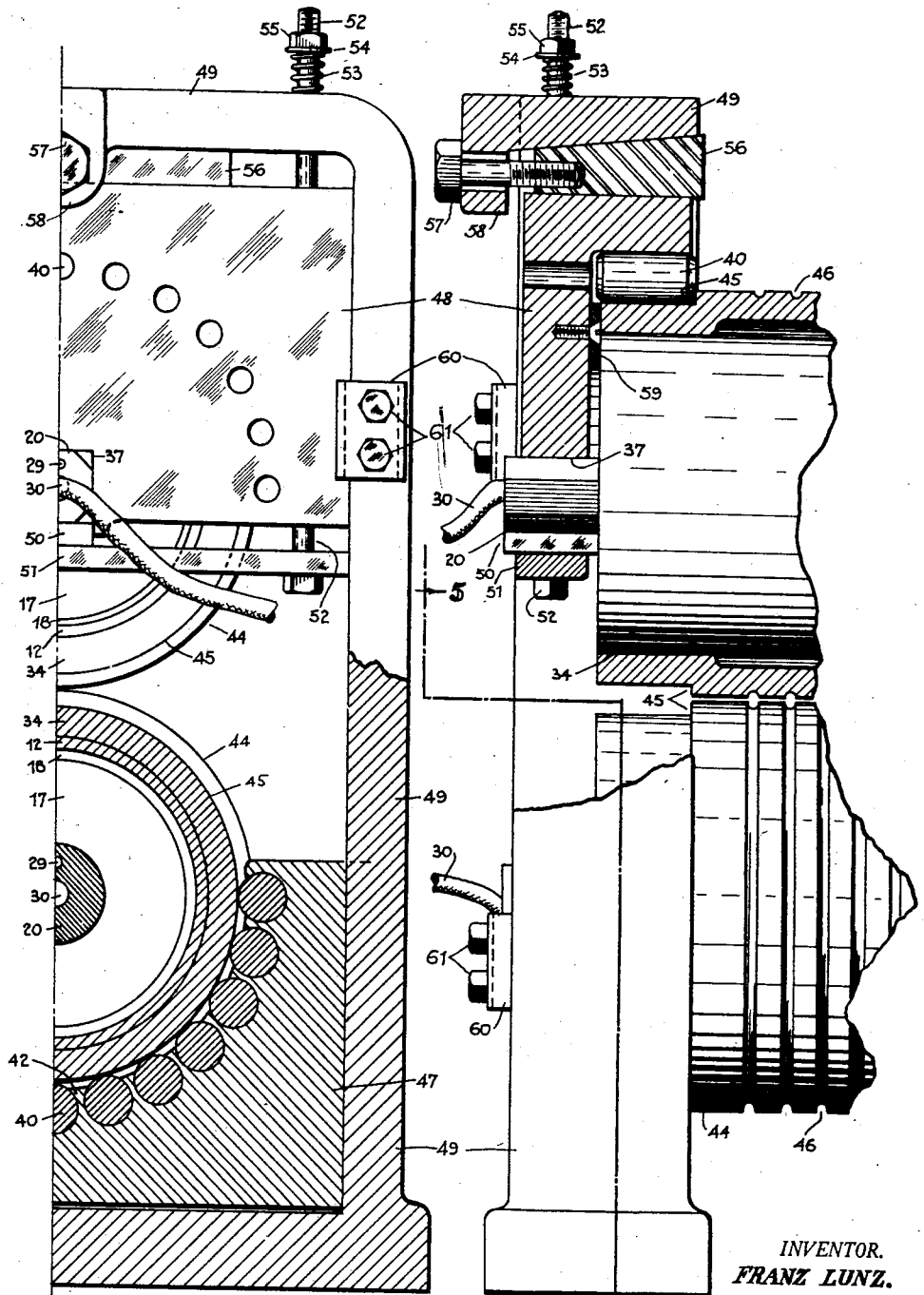

1,674,516

UNITED STATES PATENT OFFICE.

FRANZ LUNZ, OF NEW YORK, N. Y.

MOTOR-DRIVEN CYLINDER.

Application filed February 19, 1927. Serial No. 169,601.

My invention relates to improvements in driving cylindrical bodies, which in the form of pulleys, rolls, drums, sheaves, etc., perform work by electric motor power, the motor being arranged inside of the cylindrical body; and the objects of my invention are, first, to have the motor part enclosed, protected and removed, second, to economize in space, third, to simplify the foundation and the task of the mill-wright, fourth, to eliminate transmission gearing, fifth, to equalize the loads on the bearings, sixth, to separately support the torque load and the working load, seventh, to increase the electric efficiency, eighth, to increase the overall efficiency, ninth, to economize in lubrication, and, tenth, to minimize wear and tear.

I attain these objects by the mechanism illustrated in the accompanying drawings, in which,—

Fig. 1. Is a side view and section of the symmetric half of a hoist embodying my invention; Fig. 2. Is the end view of the symmetric half of the same hoist; Fig. 3. Shows the side view and section of a roll embodying my invention, and its mounting. Fig. 4. Shows the end view of the symmetric half of the same roll; Fig. 5. Is an end and sectional view of the symmetric half of a rolling mill embodying my invention; Fig. 6. Shows a sectioned and side view of an end of that rolling mill.

Similar numerals refer to similar parts throughout the several views.

In Fig. 1, the circular housing 8 arising from the plate 9 contains, grouped in a circle, the rollers 10, the other ends of which are supported in the flange 11 on said housing. Into this roller cage, resting against the flange 11, the cylinder 12 is rotatably mounted. It carriers the sheave 13. Against a shoulder 14 on the inside of the cylinder rests the circular bed 15 into which fits the outer race of roller bearing 16. A plate 17 holds this outer race in the bed and the whole is held in position in cylinder 12 by the expansion ring 18. Through packings 19 in bed 15 and in plate 17 passes shaft 20 which rests in the inner race of roller bearing 16. The end of shaft 20 is shaped to fit the square hole 21 in flange 11. Against a shoulder 23 on the shaft, and a shoulder 22 in the cylinder 12 rest the laminated stator and rotor cores respectively, separated by air gap 24. Whereas all other parts of half of the hoist shown are the same in the symmetric half not shown, there can, of course, not be the same shoulders 22 and 23 on the shaft and in the cylinder at the other end, but the laminated cores are held there by other suitable means, for instance, expansion rings like ring 18, shown, set screws, or other holding means. The stator and rotor are indicated as of the squirrel cage induction polyphase type; the rotor has bars 25 short-circuited by ring 26; the stator winding 27 is fed from a cable 30 which passes to it through a hole 28 in the center of the shaft 20. The corresponding hole in the other end of the shaft serves to admit compressed air for the cooling of the motor windings. A canal 29 drilled into the shaft above the hole 28 serves for the lubrication of the roller bearing through clearance space 31.

In Figures 3 and 4, the cylinder 12 is concentrically surrounded by a shell 32, shrunk onto that cylinder at the ends; this shell serves as a working surface and protects the cylinder; for replacement it is simply burst and a new shell is shrunk onto the cylinder. The air pocket 33 between the webs 34 inside of the shell serves as an insulation against undue propagation of heat from the working surface on the outside to the cylinder and the motor parts inside. The frame 35 is a continuity with provisions to support rolls at the desired distance from each other; it is spaced from the frame on the other end of the rolls by suitable braces. By 36 it is suitably anchored in the concrete foundation. The square end of the shaft 20 fits into a suitable slot 37 in the frame. The cable 30 from the stator winding on the motor has a plug on its end by means of which the motor is connected to the electric current supply at receptacle 38. A semi-circular ring 39 forms part of the frame; it serves as a bed for the rollers 40 which are held in it by the retainer plate 41. Segments of the rollers 40 protrude through the inside 42 of the ring 39 and there the shell 32 rests upon them. After the cover plate 43 has been removed from its seat in the foundation, and after the plug has been withdrawn from the receptacle 38, the whole roll may be lifted out.

In Figures 5 and 6, two cylinders 12 containing the motors are located on top of each other, each one surrounded by a shell 44 similar to shell 32 on the roll in Figures 3 and 4. But in this case the ends of the shells are recessed at 45, 45 and into the recess fit the rolls 40. The outsides of the shells are provided with grooves 46 to suit the steel shapes to be formed, as usual in rolling mill practice. The roller beds 47 and 48 are semi-circular on the inside, similar to the half-circular ring 39 in Figures 3 and 4. But the outsides of these beds are square, fitted into the sides of frame 49. The lower bed 47 rests in the bottom of the frame; the upper bed 48 hangs; the square end of shaft 20, similar to the arrangement in Figures 3 and 4, fits into slot 37; below it is a flat piece 50; this rests on cross piece 51, into the ends of which are pinned the bolts 52 which extend through the bed 48, through the frame 49 with compression springs 53, washers 54 and nuts 55 on top. The tension of springs 53, lifting cross-bar 51, holds the shaft in the bed and, counteracting the weight of the bed and the roll, presses it against wedge 56 which is held between the inclined inside of the frame and the top of bed 48 by screw 57 in a lug 58 on the frame. Tightening of the screw pulls the wedge in, whereby the upper roll is lowered and brought closer to the lower roll. This is my means of adjusting the distance between the rolls, which, of course, may also be brought about by the usual method of a large adjusting screw through the center of the frame at the top against the upper bed 48. The end-thrust of the rolls is taken up by a half circular brass ring 59 fastened by flat head screws into beds 47 and 48. Of course, a roller thrust bearing may take the place of this ring, between the beds and the rolls. The sidewise adjustment of the rolls is brought about by channel-clamps 60, one leg of which rests on the frame, the other on the beds, and adjusted by two screws 61.

It is evident that to operate my motor I do not have to mount the stator in the rotor cylinder by roller-bearings like 16 nor by any other bearings; the stator may simply by stationarily and coaxially mounted in the frame. But I attain some very important advantages by this arrangement. The working load is taken up by the outer rollers; only the torque load is taken up by the roller-bearing 16 if I allow a slight play between the square end of the shaft and the square hole or slot in which it is held, thence, the wear on bearings 16 is very small and the air gap 24 may be made much smaller than ordinarily necessary. With or without roller-bearing 16, all loads are applied centrally between the two ends of support which guarantees an even wear. The increase in efficiency due to these considerations is considerable and applies to my invention under all conditions. However, in specific cases, eliminating transmission losses in addition to the above gain in efficiency, the advantage of the use of my motor is considerably enhanced. I find for instance, that in an application of my invention to a rolling mill, only one third of the current input is required to obtain the same output as in the customary arrangement.

The use of my motor drive has a tremendous advantage in regard to the mounting of machinery. The foundation expenses in the case of very heavy machinery are considerably reduced; in some cases of application no foundation at all is required. The saving of floor space by my invention and the reduction of the weight of apparatus is particularly felt in its application for elevators in buildings.

I do not want to limit the scope of my invention to polyphase induction motors; a commutator or slip ring may be adapted to the rotating cylinder as it is ordinarily applied to armatures; thus I am able to operate my drive from any source of current supply in any known type of electric motor arrangement.

I claim:

1. In combination, a frame, a cylindrical electric rotor rotatively mounted in said frame and a stationary electric stator rotatively mounted in and supported by said rotor.

2. In combination, a frame, a cylindrical electric rotor rotatively mounted in said frame, bearings in said rotor and a stationary electric stator rotatively mounted in and supported by said bearings.

3. In combination, a frame, a cylindrical electric rotor rotatively mounted in said frame, bearings in said rotor and an electric stator rotatively mounted in and supported by said bearings and nonrotatively held in but not supported by said frame.

4. In combination, a frame, roller bearings in said frame, a cylindrical electric rotor rotatively suspended in said roller bearings, and an electric stator rotatively mounted in and supported by said rotor and nonrotatively held in but not supported by said frame.

5. In combination with a motor consisting of rotor rotatable around a stator, roller bearings supporting said rotor, bearings on said rotor in which the said stator is rotatively suspended, and means preventing the rotation of that stator.

FRANZ LUNZ.